Patented Dec. 22, 1931

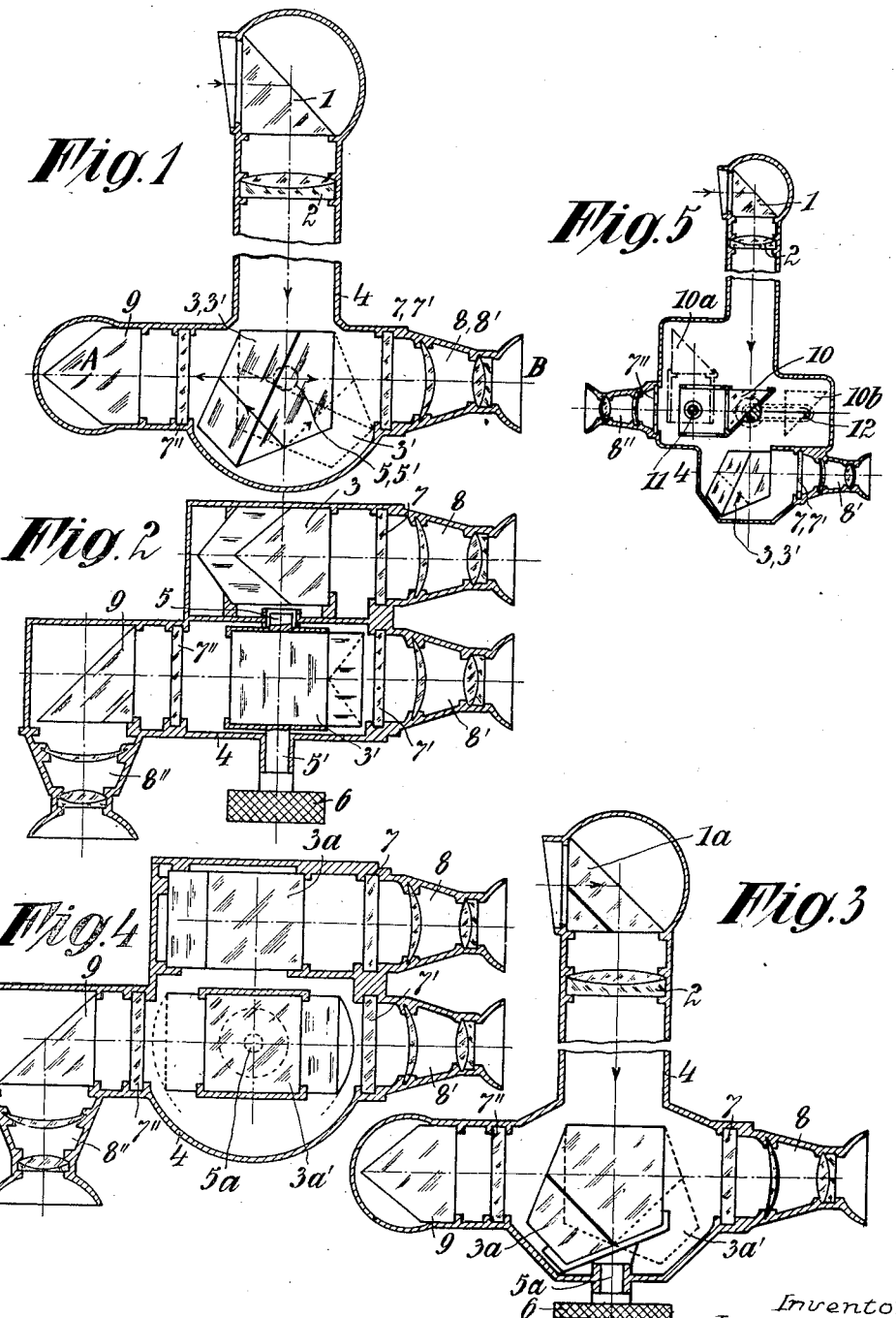

1,837,920

UNITED STATES PATENT OFFICE

IGNAZ PECHAN AND JOHANN SCHIER, OF VIENNA, AUSTRIA, ASSIGNORS TO ACTIEN-GESELLSCHAFT C. P. GOERZ OPTISCHE ANSTALT, ACTIOVA SPOLECNOST K. P. GOERZ OPTICKY USTAV, OF BRATISLAVA, CZECHOSLOVAKIA, A CZECHOSLOVAK COMPANY

TELESCOPE

Application filed December 5, 1929, Serial No. 411,884, and in Germany December 7, 1928.

The invention has for its object to enable a second observer to observe temporarily the field of vision of a double telescope.

With this object in view the double telescope constructed as a telescope having an angular optical axis is provided with at least two prisms in each of its halves and according to the present invention the prism adjacent to the diaphragm of the image field of one of the telescope halves or a prism arranged in front of such prism is adapted to be so turned or slid that by the adjustment of the adjustable prism the image producing pencils of light are so deflected that they produce in the diaphragm of the field of vision of a third eye piece a real image permitting a second observer to observe the field of vision.

The annexed drawings show by way of example in diagrammatical views, embodiments of the present invention. Fig. 1 shows in side elevational section a constructional form with simple entering reflectors and the pentagonal prisms adjacent to the main eye pieces. Fig. 2 is a section on the line A, B Fig. 1. Fig. 3 shows a constructional form with another form of the entering prism and with another form of the pentagonal prisms, adjacent to the main eye pieces. Fig. 4 is a plan view thereof and Fig. 5 shows a constructional form with a separate rotatable or sliding deflecting prism.

In Fig. 1 there is provided in each of the halves of the telescope below the simple entering prism 1 an objective 2 and a combined penta prism 3, 3' in Fig. 2 by which the rays incoming in the direction of the optical axis are deflected rectangularly.

The prism 3' in the left hand half of the telescope is mounted rotatably by means of the coaxial trunnions 5, 5' secured to the metallic casing of the prisms, the axis of such trunnions passing through the point of intersection of the ray of light in coming in the optical axis and the ray passing to the eye piece after reflection. If this rotatable prism occupies the same position as the stationary prism 3 in the right hand half of the double telescope such stationary prism being shown in full lines in Fig. 1 the same image will appear in both diaphragms 7, 7' of the field of vision and will be seen in the main eye pieces 8, 8' the same as in any ordinary double telescope. If, however, it is desired that the image be observed also by a second observer, the rotatable prism mounted in the left hand half of the telescope must be turned by means of the handle 6 secured to the trunnion 5' through an angle of 90° into the position shown in dotted lines in Fig. 1 whereby the pencil of rays entering this prism is reflected in the opposite direction and produces a real image in the plane of the diaphragm 7" of the field of vision of the eye piece 8" which image, however, is reversed as vertically and horizontally as compared with the images in the diaphragm 7 and 7'. This reversed image may be observed by a second observer through the eye piece 8" and may be uprighted by a well known uprighting prism 9.

Another constructional form of the invention is shown in Figs. 3 and 4 in which a somewhat different form of the entering reflecting prism 1a is used while ordinary penta prisms 3a, 3a' are used in connection with the diaphragm 7, 7' of the fields of vision. The prism in the right hand half of the telescope is journalled in the telescope casing 4 on journal pin 5a coaxial with the objective axis. The prism 3a' may be rotated by means of the handle 6 secured to the journal pin 5a through an angle of 180° from the position shown in Fig. 3 in full lines into that shown in dotted lines whereby the image producing pencil of rays is reflected in the opposite direction and reaches through the prism 9 the eye piece 8" for the second observer.

It is obvious that in the constructional form shown in Figs. 1 and 2 the prisms 1 may be interchanged with the prisms 3 and 3' the same as in the constructional form shown in Figs. 3 and 4 the prisms 1a may be interchanged with the prisms 3a and 3a'.

In the constructional form shown in Fig. 5 the prisms 3, 3' adjacent to the diaphragms 7, 7' of the field of vision are stationary but in front of one of such prisms a supplementary prism 10 is mounted which may be either rotatable in the telescope casing 4 around an axis 11 in such a manner that by rotating it, means of a handle secured to the said axis, this prism 10 may be turned out of the path of the rays of light into the position 10a indicated in dotted lines. It will be readily understood that according to the position of the supplementary prisms the rays may be directed either into the main observation eye piece 8' or into the eye piece 8" for the second observer. The same effect is secured by making the supplementary prism slidable along the guide 12 in a direction at right angles to the ray incoming in the direction of the optical axis, the said guide being secured in the telescope casing, so that this prism 10 may be brought either into the position shown in full lines in Fig. 5 for enabling a second observer to observe the image through the eye piece 8" or into the position 10b shown in broken lines when the telescope may be used as an ordinary double telescope for one observer only.

What we claim is:

1. A double telescope comprising a casing, a pair of objectives and associated main eye pieces mounted in such casing, two sets of prisms each associated to one of the said objectives and the eye piece associated thereto, a third eye piece and means for deflecting the rays of light from one of the said main eye pieces to the third eye piece.

2. A double telescope comprising a casing, a pair of objectives and associated main eye pieces mounted in such casing, two sets of prisms each associated to one of the said objectives and the eye piece associated thereto, a third eye piece and means for deflecting the rays of light from one of the said main eye pieces to the third eye piece, such means comprising a reflecting prism and means for adjusting such reflecting prism.

3. A double telescope comprising a casing, a pair of objectives and associated main eye pieces mounted in such casing, two sets of prisms, each associated to one of the said objectives and the eye piece associated thereto, a third eye piece and means for turning one of the said sets of prisms within the said casing whereby the rays of light are deflected from one of the said main eye pieces into the third eye piece.

In testimony whereof we have affixed our signatures.

IGNAZ PECHAN.
JOHANN SCHIER.